March 10, 1925.  1,529,003
C. P. ALLING
HARVESTER
Filed June 10, 1920   4 Sheets-Sheet 4
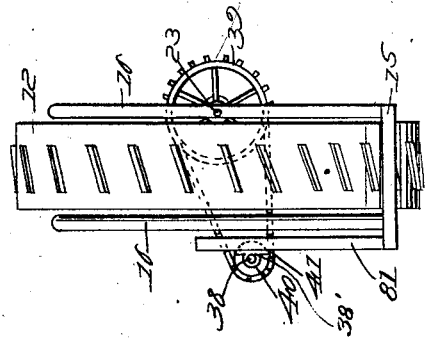
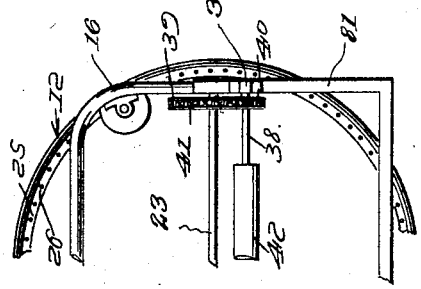
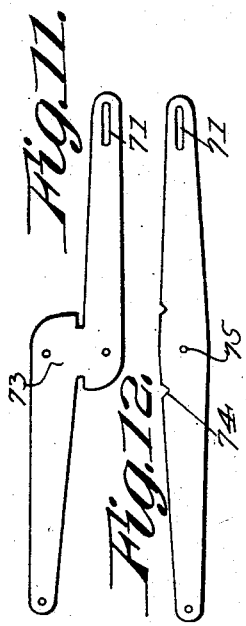
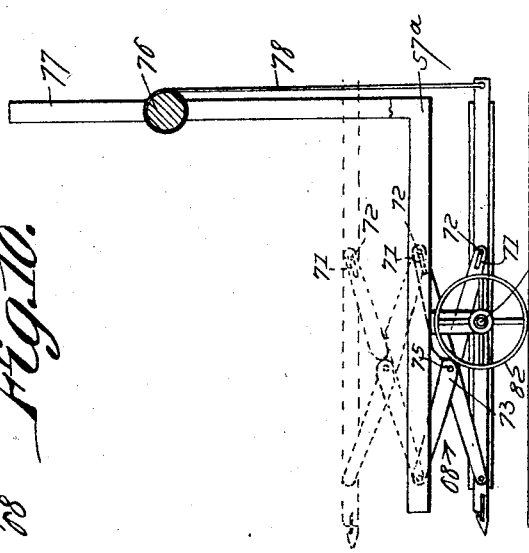
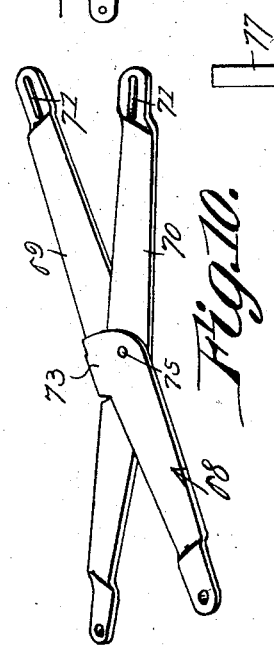
Inventor
C.P. Alling,
By
Attorneys Patented Mar. 10, 1925.

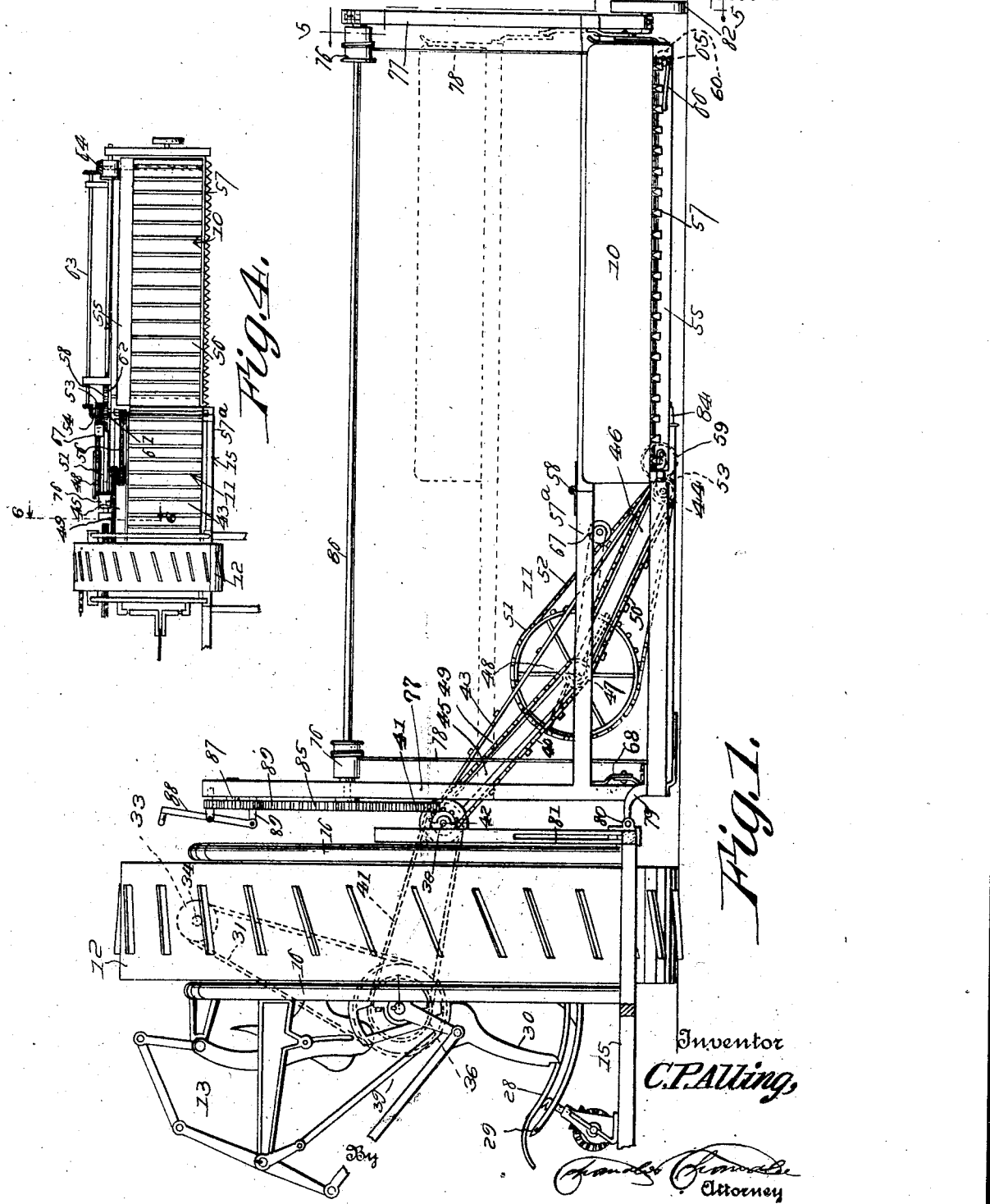

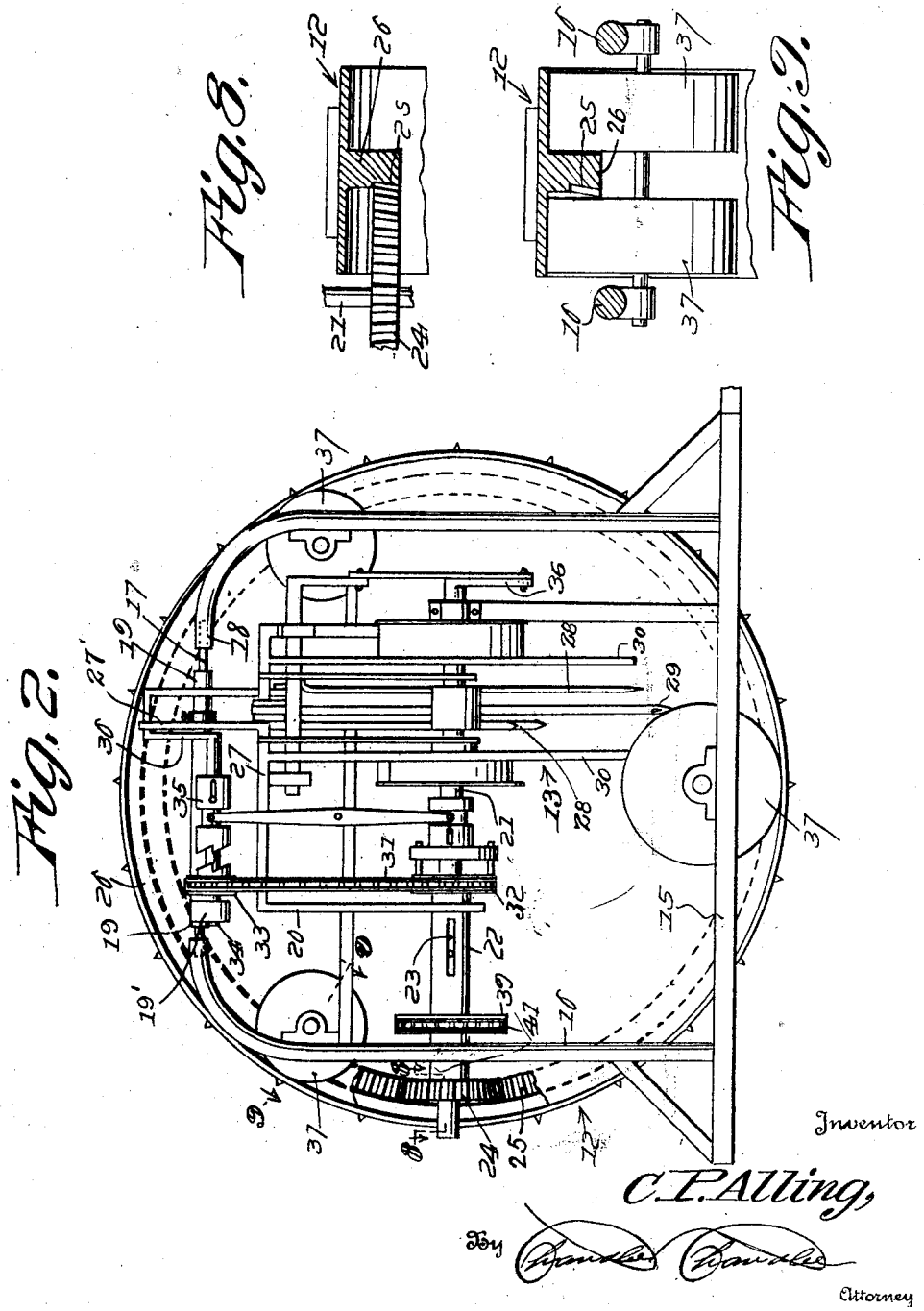

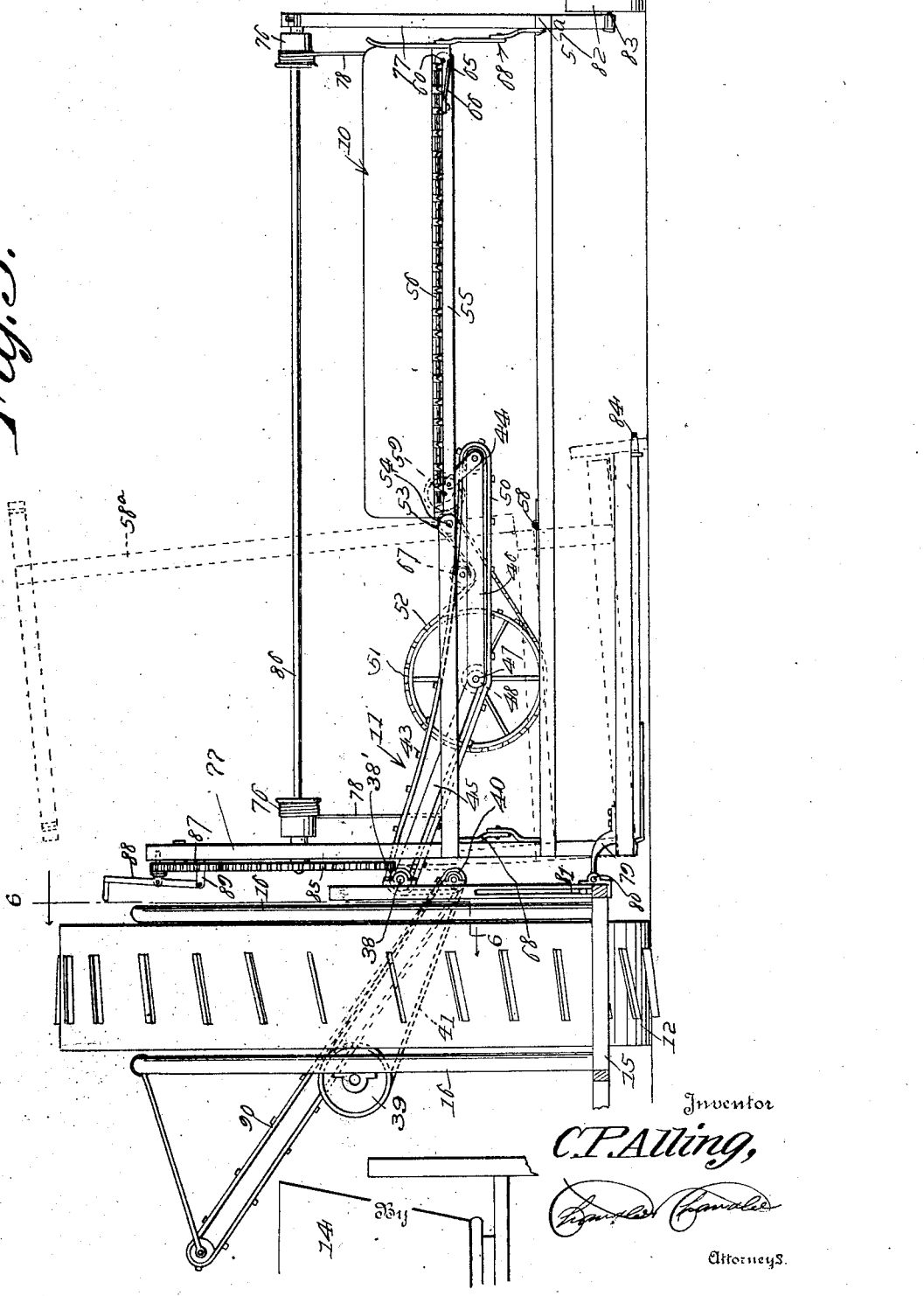

1,529,003

UNITED STATES PATENT OFFICE.

CALVIN P. ALLING, OF WICHITA, KANSAS.

HARVESTER.

Application filed June 10, 1920. Serial No. 387,844.

*To all whom it may concern:*

Be it known that I, CALVIN P. ALLING, a citizen of the United States, residing at Wichita, in the county of Sedgwick, State of Kansas, have invented certain new and useful Improvements in Harvesters; and I do hereby declare the following to be a full, clear, and exact description of the invention, such as will enable others skilled in the art to which it appertains to make and use the same.

The object of the invention is to provide a convertible harvester and header suitable for interchangeable adaptation by means capable of simple readjustment to adapt it for use either as a harvester in which form the sickle bar may be arranged to cut at any preferred distance from the surface of the soil, or as a header wherein provision for variation of the plane of the cutting mechanism to suit the height of the grain is afforded, and furthermore, to provide a machine of this general type wherein the cutting mechanism may be folded to economize space and secure compactness for facility in transportation to and from the zone of operations, and with these general objects in view, together with others of a more or less dependent bearing, as will appear in the course of the following description of a preferred embodiment thereof, the invention consists in a construction, combination and relation of agencies, illustrated typically in the accompanying drawings, it being understood, however, that changes in form, proportions and details, particularly as to arrangement and with reference to adapting the principle to machines for the handling of specifically different products may be resorted to, within the scope of the appended claims, without departing from the spirit of the invention.

In the drawings:

Figure 1 is a front elevation of a harvester-binder, made in accordance with the present invention, with the parts adjusted for use in cutting the grain at the usual height from the ground.

Figure 2 is a side view looking grainward.

Figure 3 is a front view partly broken away with the parts shown in an elevated position adapted for operating as a header where the grain is comparatively short.

Figure 4 is plan view on a reduced scale to show the relation between the vertically movable conveyor and cutter platform and the supporting frame extension.

Figure 5 is an end view showing the conveyor platform in full lines and dotted lines, respectively, in its depressed and elevated positions.

Figure 6 is a fragmentary elevation of the parts of Figure 7, viewed from the left-hand side of said figure, to indicate the means whereby motion is communicated from the bull wheel to the elevator and conveyor mechanism, only the lower roller 42 being shown.

Figure 7 is a rear elevation of the bull wheel, showing the elevator belt driving means.

Figure 8 is a detail sectional view on the plane indicated by the line 8—8 of Figure 2.

Figure 9 is a similar section on the plane indicated by the line 9—9 of Figure 2.

Figure 10 is a detail view in perspective of one of the lazy tongs platform supporting or hanger members.

Figures 11 and 12 are detail views respectively of the elements of one of the platform supporting or hanger members.

The invention consists essentially in providing a cutter and conveyor mechanism indicated generally at 10 which is adapted for vertical adjustment to provide for cutting the grain at widely different distances from the surface of the soil to adapt the mechanism for use either as a grain harvester-binder or a header; an elevator mechanism indicated generally at 11 which is adaptable in position to the plane of the cutter and conveyor mechanism for receiving the grain or other products from the conveyor and conducting the same to the side of the bull wheel 12 which serves as the member through which motion is communicated to the various parts of the mechanism and may be for convenience regarded as the motive power and a binding or bundling and tying mechanism indicated generally at 13 which is adapted when the machine is used as a harvester, to receive the product from the elevator and deliver it in the usual way in the form of bundles, suitably tied, for transportation to a place of storage.

Inasmuch as bundling or binder mechanism is not required in an operation of the machine as a header and is ordinarily arranged in or adjacent the side of the bull wheel and occupies the space within the tread or periphery of the bull wheel, and hence serves to obstruct the passage of material through the bull wheel or from one side to the other of the plane thereof when the machine is used as a header, and whereas it is desired to deposit the grain heads, for example, in a suitable receptacle such as a wagon 14 driven in a path parallel with the harvester and at the side opposite to the cutter mechanism as indicated in Figure 3, it is proposed to provide for the convenient dismounting or removal of the binder mechanism when the machine is to be used as a header, while insuring the practical and operative support of the same in suitable relation with the other features of the mechanism when the machine is to be used as a harvester. To this end there is provided in connection with the bull wheel a floating frame represented in the construction illustrated by the base 15 and the parallel arches 16 arranged respectively at opposite sides of and close to the bull wheel with the key or central top portions of said arches represented by hanger rods 17 removably fitted terminally in sockets 18 and extended through sleeves 19 which support hangers 20 in which is mounted a shaft extension 21 having a telescoping detachable connection through a coupling 22 with a main drive shaft 23 mounted upon the floating frame and provided with a spur wheel 24 which engages its teeth in the openings 25 in the internal driving rim 26 of the bull wheel.

Upon this shaft extension 21 and suitable elements of the hanger frame 27 of which the sleeve 19 and hanger bars 20 form parts, are mounted the bundling and tying mechanisms which, in so far as essential features of the present invention are concerned, are adapted to be modified in various ways with the sole restriction that they should be so related with each other and with the hanger frame, which is removable from the floating frame by displacement of hanger rods 17, as to permit of the dismounting of such binder and tying or knotter mechanisms to leave the space bounded by the bull wheel rim substantially unobstructed to permit of conveying the grain heads therethrough for deposit in the receptacle 14 when the machine is to be employed as a header. The removal of the terminals of the hanger rods 17 from the socket 18 permits removal of the hanger frame 27, said rods being capable of endwise movement for this purpose.

In the construction illustrated, and for the purposes of illustration in connection with the present invention, it has been deemed sufficient to indicate the grain chute 28, the needle 29, the packers 30, with a chain connection 31 extending from a sprocket wheel 32 on the shaft extension 21 to the sprocket wheel 33 on a clutch shaft 34 carrying a clutch 35 for controlling the coupling of the needle operating crank 36 with the driving mechanism, together with related parts of which the substantial equivalents in function are found in binder and knotter mechanisms now in common use. The shaft 34 is supported, at one end, in a bracket 19' carried by a sleeve 19, while the other end is supported on a vertical extension 27', of the frame 27. The floating frame is supported in the bull wheel by means of the planetary rollers 37.

The upper and inner shaft 38 (Fig. 7) of the elevator mechanism is mounted in bearings 38' upon the floating frame which serves as the main supporting frame of the machine and receives its motion from the drive shaft 23 through a speed multiplying mechanism consisting of the sprocket wheels 39 and 40 and the connecting chain 41, said wheels being dimensioned on a ratio of four to one and the roller 42 traversed by the elevator apron 43 is carried directly by said shaft 38 while the lower or outer roller 44 of the elevator apron is carried by a folding or knuckle frame consisting of the arms 45 and 46 jointed at 47 coaxially with an intermediate shaft 48 to which rotary motion is communicated by means of a belt or chain 49 and from which rotary motion in turn is communicated by a chain 50 to the lower roller. The shaft 48 carries a sprocket wheel 51 connected by a chain 52 with a reduced sprocket wheel 53 on a shaft 54. A platform 55 as seen in Figs. 1, 3, and 4 carries the conveyor apron 56 and the cutter bar 57, and is vertically movable in a grainward extending frame 57ª supported by the main or floating frame and hinged thereto at 58 to adapt it to be folded into a substantially upright position as indicated in dotted lines at 58ª in Figure 3. The conveyor apron 56 traverses rollers 59 and 60 adapted to receive motion from the sprocket wheel 53 as for example, through gears 61 and 62, to the end that a relatively slow motion may be imparted thereto, while the cutter bar may receive motion from the shaft 54 through any suitable gearing such as the rod 63 and the shaft 64 carrying the crank 65 to which is connected the sickle pitman 66, but it will be understood that other means of communicating motion both to the conveyor apron and the sickle bar may be employed, provided the design thereof is such as to permit of the free vertical movement of the conveyor platform from the depressed harvester position indicated in Figure 1 to the elevated or header position indicated in Figure 3 or to a greater height than shown in Figure 3 when necessary to operate upon grain of which the height requires a more elevated cut. The slack in the chain 52 by which motion is communicated from the intermediate shaft 48 to the shaft 54 may be taken up by any suitable tensioning or belt tightening means such as that indicated at 67.

The conveyor platform is supported within the grainward extending frame extension 57ª by means of hangers consisting of lazy tongs members 68 indicated in detail in Figures 5 and 10, located respectively at the inner and outer ends thereof, the elements 69 and 70 of each hanger member being terminally connected respectively with the frame extension 57ª and conveyor platform as indicated in Figure 5 with suitable provision for sliding movement at one end as indicated by the slots 71 engaging pins 72, and with the hanger member 69 provided with a cross head 73 for engagement with the upper edge of the member 70 as in the notches 74 for limiting the deflection of the members and holding them in rigid relation at the limits of downward and upward movement of the conveyor platform. The elements of each hanger are pivotally connected as indicated at 75 and the relation between the elements is such as to permit of the location of the conveyor platform either below or above the plane of the frame extension 57ª.

The means for effecting the vertical movement of the conveyor platform 55 and of holding the same in its adjusted positions may also be variously modified but in the construction illustrated, embodies a pair of drums 76 mounted upon the ends of the shaft 86, which shaft is mounted in the uprights 77 on said frame extension and having connection by cables 78 with the conveyor platform which in turn is suitably guided for vertical movement in the frame extension by fitting it at its inner end, adjacent to the main or floating frame, with the bracket 79 engaged with a guide 80 on an upright 81 of said frame.

Also, as a means of supporting the grainward extremity of the frame extension supplemented by the weight of the conveyor platform, there is provided a supplemental ground wheeel 82 adapted for interchangeable mounting upon a spindle 83 located at said grainward end of the frame extension and a spindle 84 carried by the stationary portion of the frame extension adjacent to the plane of the hinge 58, to the end that when the foldable portion of the frame extension is arranged in its substantially upright position as indicated in dotted lines in Figure 3, the supplemental ground wheel may be transferred to the position indicated in dotted lines in Figure 3 to aid in sustaining that portion of the frame extension upon which is imposed the weight of the conveyor platform when folded.

Obviously when the machine is being employed as a harvester and the binder and knotter mechanisms are in their normal positions as indicated in Figures 1 and 2, the grain cut by the sickle bar and dropped upon the conveyor platform is carried by the conveyor apron to the apron of the elevator and thence transported to the plane of the bull wheel where it is discharged in the ordinary way into the grain chute 28 for compacting, bundling and tying in accordance with the ordinary procedure.

On the other hand, when it is desired to employ the machine as a header, the binder and knotter mechanisms having been dismounted by withdrawing the hanger rods 17 and disengaging the sleeve 19 therefrom, the shaft extension 21 being disconnected from the drive shaft at the coupling 22, the conveyor platform may be elevated through the agency of the drum 76 to suit the height of the crop, for which purpose, operating mechanism consisting of the gear 85, attached to the end of the drum shaft 86, and arranged in mesh with a pinion 87 having a crank 88, may be used, the locking of the parts at the desired adjustment being effected for example, through the bolt 89 carried or actuated by the crank 88. The motion conveying connections between the driven shaft 38 and the platform conveyor and cutter mechanisms are disposed by reason of the jointed or knuckle frame to adapt themselves to the vertical movement of the platform, so that the elevator apron 43 is in position in the elevated adjustment of the conveyor platform to perform its function of receiving the grain heads from the conveyor apron and conducting the same transversely through the bull wheel where a supplemental conveyor 90 of any suitable construction and mounted in any convenient manner, may be extended through the unobstructed space bounded by the rim of the bull wheel to conduct the grain heads to a suitable receptacle represented at 14 and which, as above indicated, may consist of a vehicle traversing a path adjacent to and parallel with that of the harvesting machine.

This conveyor apron 90 is driven by means of the chain 31 engaged around the sprockets 39 and 40, as clearly seen in Figure 3.

What is claimed is:

1. A harvester having a vertically adjustable cutter mechanism and platform conveyor, means for adjusting the cutter mechanism and platform conveyor, a centrally open bull wheel, cutter bar drive mechanism actuatable by the bull wheel in all adjustments of the cutter mechanism, a floating frame mounted upon and carried by the bull wheel, a drive shaft, means for supporting the shaft on the said frame, binder mechanism detachably mounted upon the floating frame and having operative connection with said drive shaft, and elevator mechanism driven by the bull wheel and having its receiving end adjustable with the cutter mechanism for conducting the product from the platform conveyor through the bull wheel.

2. A harvester having a vertically adjustable cutter mechanism and platform conveyor, a centrally open bull wheel, cutter bar drive mechanism actuated by the bull wheel in all adjustments of the cutter mechanism, a floating frame supported by the bull wheel and having a drive shaft actuated by the same, a hanger frame detachably mounted upon the floating frame and carrying an operating shaft detachably coupled to the drive shaft, binder mechanism carried by the hanger frame and actuated by said operating shaft, and elevator mechanism operatively connected with the drive shaft for conducting the product from the platform conveyor through the bull wheel.

3. A harvester having a vertically adjustable cutter mechanism and platform conveyor, a centrally open bull wheel, a cutter bar drive mechanism actuated by the bull wheel in all adjustments of the cutter mechanism, a floating frame supported on and having a drive shaft actuated by the bull wheel, said frame having side arches disposed at the opposite sides of the bull wheel tread and provided with guide rods, a hanger frame having carriers detachably and adjustably mounted upon said guide rods, binder mechanism mounted upon the hanger frame and having an operating shaft detachably coupled to the drive shaft, and elevator mechanism actuated by the drive shaft for conducting the product from the platform conveyor through the bull wheel.

4. A harvester having a bull wheel and a grain-side frame extension including a stationary and a movable member, a platform frame mounted for vertical adjustment upon said frame extension and carrying a cutter mechanism and platform conveyor, grain-side supporting wheel spindles carried respectively by the stationary and foldable members of the frame extension, a wheel for interchangeable mounting on said spindles, elevator mechanism mounted at its receiving end upon the platform frame for conducting the product from the conveyor through the bull wheel, and means on the frame extension for varying the plane of elevation of the platform frame.

5. A harvester having a bull wheel and grain-side frame extension, a platform frame carrying a cutter mechanism and conveyor, an elevator carried at its receiving end by the platform frame, operating connections between the bull wheel and said cutter mechanism and elevator, reversible lazy tongs hangers connecting the platform frame to the frame extension, and means carried by the frame extension for elevating and lowering the platform frame.

6. A harvester having a bull wheel and grain-side frame extension, a platform frame carrying a cutter mechanism and conveyor, an elevator carried at its receiving end by the platform frame, operating connections between the bull wheel and said cutter mechanism and elevator, reversible lazy tongs brackets connecting the platform frame with the frame extension, and each consisting of intersecting pivotally connected members each of which is pivotally mounted respectively upon the frame extension and the platform frame, and means carried by the frame extension for varying the elevation of the platform frame.

7. A harvester having a bull wheel and grain-side frame extension, a platform frame carrying a cutter mechanism and conveyor, an elevator carried at its receiving end by the platform frame, operating connections between the bull wheel and said cutter mechanism and elevator, reversible lazy tongs brackets connecting the platform frame with the frame extension, each consisting of intersecting pivotally connected members of which each is pivoted at one end and slidably connected at the other end respectively to the frame extension and platform frame, and means for varying the elevation of the platform frame.

8. A harvester having a bull wheel and grain-side frame extension, a platform frame carrying a cutter mechanism and conveyor, an elevator carried at its receiving end by the platform frame, operating connections between the bull wheel and said cutter mechanism and elevator, reversible lazy tongs brackets connecting the platform frame with the frame extension, each consisting of intersecting pivotally connected members of which one is composed of parallel spaced elements for operation at opposite sides of the plane of the other member and connected by a bridge piece adjacent to the pivotal connection to permit of the reverse position of said members, and means for varying the elevation of the platform frame.

9. A harvester having a bull wheel and a grain-side frame extension, a platform frame mounted upon the frame extension for vertical movement relative to the plane of said frame extension and carrying cutter and conveyor mechanisms, means for holding the platform frame in its adjusted position, operating connections between the bull wheel and said cutter and conveyor mechanisms, and elevator mechanism consisting of an apron, inner and outer rollers mounted respectively adjacent to the bull wheel and the platform frame, and a knuckle frame carrying said rollers and foldable to compensate for movement of the platform frame relative to the inner apron carrying roller.

10. A harvester having a bull wheel and a grain-side frame extension, a platform frame mounted upon the frame extension for vertical movement relative to the plane of said frame extension and carrying cutter and conveyor mechanisms, means for holding the platform frame in its adjusted position, operating connections between the bull wheel and said cutter and conveyor mechanisms, and elevator mechanisms having a conveyor apron, inner and outer apron supporting rollers of which the former is mounted adjacent to the bull wheel and is operatively connected therewith and the other is mounted upon the platform frame, a knuckle frame terminally mounted in coaxial relation with said rollers, and motion conveying means carried by the knuckle frame and including a speed multiplying connection for actuating the cutter mechanism.

11. A harvester having a bull wheel and a grain-side frame extension, a platform frame mounted upon the frame extension for vertical movement relative to the plane of said frame extension and carrying cutter and conveyor mechanisms, means for holding the platform frame in its adjusted positions, operating connections between the bull wheel and said cutter and conveyor mechanism, and elevator mechanism having a knuckle frame provided with terminal and intermediate shafts of which the former are located respectively adjacent to the bull wheel and the platform frame and the latter is disposed at the joint of the knuckle frame, means for communicating motion from the bull wheel to the adjacent terminal shaft of the elevator mechanism, means for communicating motion from said shaft serially to the other shafts of the knuckle frame, a drive shaft mounted upon the platform frame and operatively connected with the cutter mechanism, and operating connections between said drive shaft and the intermediate shaft of the knuckle frame.

12. A convertible harvester and header having a centrally open bull wheel, a floatable frame mounted in the bull wheel and comprising a permanent and a removable section, binder mechanism mounted upon the removable section of the floatable frame, a grain-side extension connected with the permanent section of the floating frame, a platform carrying cutter and conveyor mechanisms mounted for vertical adjustment upon the frame extension, elevator mechanism movable at its receiving end with the platform frame for conveying the product to the bull wheel, a supplemental conductor for conveying material from the elevator through the bull wheel, and operative connections between the conveyor and elevator mechanisms and the cutter and conveyor mechanisms for maintaining the delivering and receiving relations therebetween, said mechanisms being operable by the bull wheel.

In testimony whereof, I affix my signature, in the presence of two witnesses.

CALVIN P. ALLING.

Witnesses:
IRENE GREASART,
G. W. C. JERVEY.